United States Patent
Kuo

(10) Patent No.: US 6,330,514 B1
(45) Date of Patent: Dec. 11, 2001

(54) KEYBOARD TESTING SYSTEM

(75) Inventor: Li-Yu Kuo, Chung-Li (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/247,048

(22) Filed: Feb. 9, 1999

(51) Int. Cl.[7] .................................................. G01L 17/00
(52) U.S. Cl. ............................ 702/35; 702/57; 702/182; 702/33; 702/120
(58) Field of Search .................................. 702/33, 34, 35, 702/36, 40, 42, 43, 56, 57, 58, 59, 103, 113, 115, 116–118, 124, 138, 139, 182–185, 189, FOR 103, 104, 123–126, 134, 135, 143, 170, 171; 341/22; 345/168; 340/514

(56) References Cited

U.S. PATENT DOCUMENTS

| | | | | |
|---|---|---|---|---|
| 3,597,981 | * | 8/1971 | Wakabayashi | 73/432 |
| 3,602,897 | * | 8/1971 | Igel et al. | 340/172.5 |
| 3,768,622 | * | 10/1973 | Wood | 197/19 |
| 4,311,990 | * | 1/1982 | Burke | 340/365 P |
| 4,441,833 | * | 4/1984 | Hasenbalg | 400/180 |
| 4,510,583 | * | 4/1985 | Walz et al. | 364/900 |
| 4,538,146 | * | 8/1985 | Morris | 340/814 |
| 4,682,695 | * | 7/1987 | Hasenbalg | 209/571 |
| 5,019,806 | * | 5/1991 | Raskin et al. | 340/706 |
| 5,222,228 | * | 6/1993 | Asprey | 395/500 |
| 5,367,472 | * | 11/1994 | Khashayar | 364/550 |
| 5,426,450 | * | 6/1995 | Drumm | 345/168 |
| 5,501,518 | * | 3/1996 | Woodward | 364/551.01 |
| 5,605,406 | * | 2/1997 | Bowen | 400/472 |
| 5,707,160 | * | 1/1998 | Bowen | 400/472 |
| 5,785,439 | * | 7/1998 | Bowen | 400/472 |
| 5,827,983 | * | 10/1998 | Ortoli | 73/865.3 |
| 5,864,805 | * | 1/1999 | Chen et al. | 704/235 |
| 5,936,614 | * | 8/1999 | An et al. | 345/173 |
| 5,990,646 | * | 11/1999 | Kovach et al. | 318/468 |
| 6,100,875 | * | 8/2000 | Goodman et al. | 345/163 |

* cited by examiner

Primary Examiner—Hal Wachsman
Assistant Examiner—Carol S. Tsai
(74) Attorney, Agent, or Firm—Rosenberg, Klein & Lee

(57) ABSTRACT

A keyboard testing system includes a processor-based test unit electrically coupled to a microprocessor of a keyboard to be tested to test and determine if the microprocessor function properly, at least one optic sensor which is controlled by the test unit to detect light emitted from LED indicators of the keyboard for testing the indicators and a key testing device which is controlled by the test unit to sequentially actuate keys of the keyboard for testing the keys. The key testing device includes at least one pneumatic cylinder to which an end effector is mounted. The pneumatic cylinder is controlled by the test unit to move the end effector toward/away from and thus actuating/de-actuating the keys. A conveying device moves the key testing device to each of the keys for testing each of the keys. Test results obtained in testing the microprocessor, the indicators and the keys of the keyboard are transmitted to the test unit which controls a warning device to generate a warning signal when a fault condition is determined based on the test results.

12 Claims, 2 Drawing Sheets

KEYBOARD TESTING SYSTEM

FIELD OF THE INVENTION

The present invention generally relates to a keyboard testing system, and in particular, to a system which automatically testing a keyboard and analyzing and storing the test result.

BACKGROUND OF THE INVENTION

Keyboards have been widely used to serve as a man-machine interface between a user and an electronic apparatus, such as personal computer, industrial controller, and cash registers. An incorrectly-operating keyboard may lead to incorrect data input and thus cause serious damage to the electronic apparatus.

Conventionally, a keyboard is tested manually by sequentially testing a microprocessor, light emitting diode (LED) indicators and keys thereof by an operator. This is very inefficient. Furthermore, since the keys are manually depressed for test, the force that the operator applies to different keys may be different which may result in incorrect test result.

It is thus desirable to have a keyboard testing system that efficiently and effectively tests a keyboard and obtains correct test results.

SUMMARY OF THE INVENTION

Accordingly, an object of the present invention is to provide a keyboard testing system, which automatically and sequentially test a microprocessor, LED indicators and keys of a keyboard whereby the keyboard test is performed efficiently and effectively.

Another object of the present invention is to provide a keyboard testing system, which applies substantially, the same force to all the keys of the keyboard to be tested thereby reducing the likelihood of incorrect test result.

A further object of the present invention is to provide a keyboard testing system wherein the force applied to actuate keys of a keyboard can be precisely controlled.

To achieve the above objects, in accordance with the present invention, there is provided a keyboard testing system comprising a processor-based test unit electrically coupled to a microprocessor of a keyboard to be tested to test and determine if the microprocessor function properly, at least one optic sensor which is controlled by the test unit to detect light emitted from LED indicators of the keyboard for testing the indicators and a key testing device which is controlled by the test unit to sequentially actuate keys of the keyboard for testing the keys. The key testing device includes at least one pneumatic cylinder to which an end effector is mounted. The pneumatic cylinder is controlled by the test unit to move the end effector toward/away from and thus actuating/de-actuating the keys. A conveying device moves the key testing device to each of the keys for testing each of the keys. Test results obtained in testing the microprocessor, the indicators and the keys of the keyboard are transmitted to the test unit which controls a warning device to generate a warning signal when a fault condition is determined based on the test results.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENTS

Figure 1:
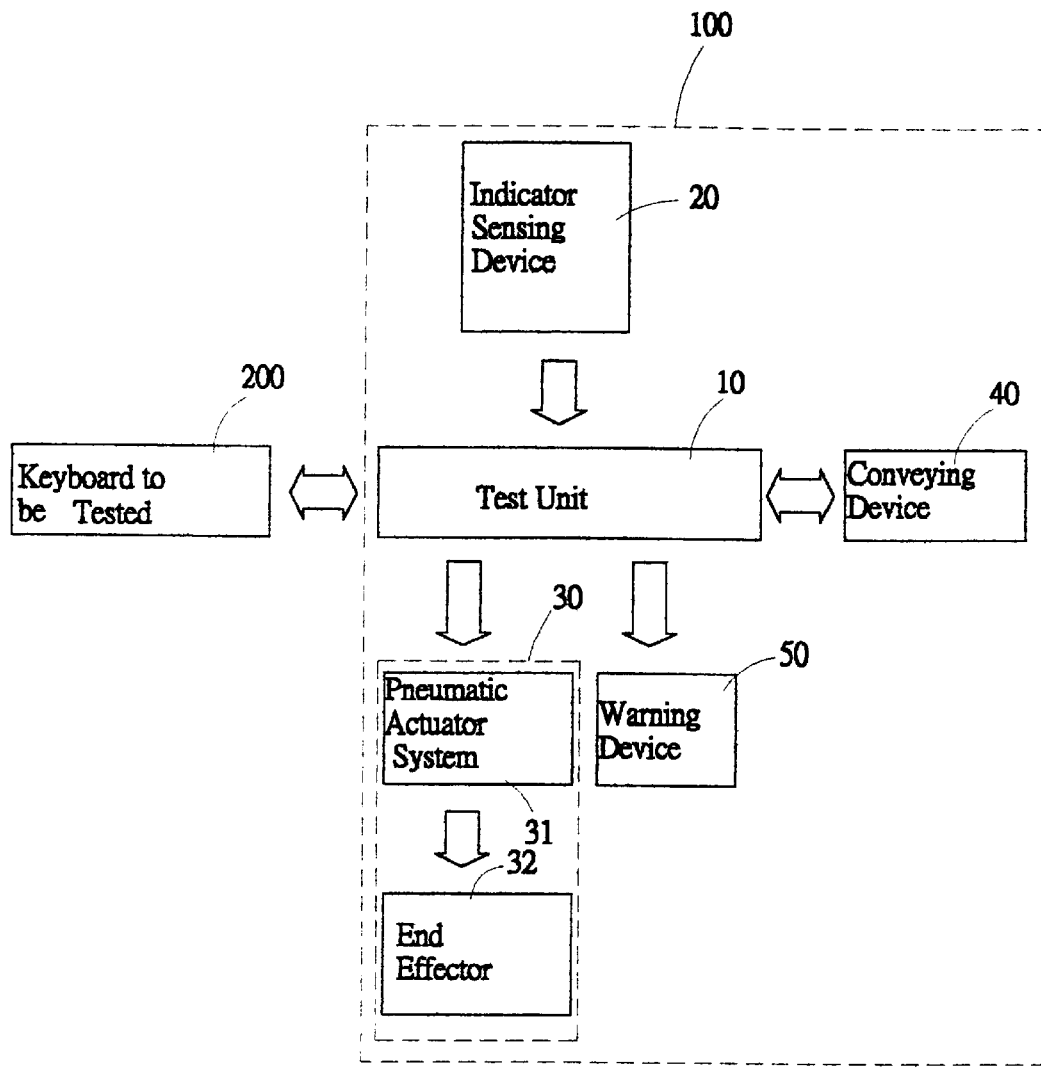
FIG. 1 shows a block diagram of a keyboard testing system in accordance with the present invention.

With reference to FIG. 1, wherein a keyboard testing system in accordance with the present invention, generally designated by reference numeral 100, is shown, the keyboard testing system 100 comprises a test unit 10 which may be of any suitable construction. An example of the suitable construction of the test unit 10 may be a combination of a personal computer and a programmable logic control electrically coupled together. The test unit 10 is programmed to sequentially test functions/parts of a keyboard for obtaining test results, analyze the test results, provide fault warning signal when the test fails and store the test results. Furthermore, an automatic test process may be established in the test unit 10 whereby an automatic test of the keyboard is obtained.

A keyboard to be test 200 which comprises a microprocessor is electrically connected to the test unit 10 and controlled by the keyboard testing system 100 whereby signals generated by the keyboard are transmitted to the test unit 10. The signals include at least a signal generated by a microprocessor of the keyboard 200. The keyboard 200 also comprises a number of keys and indicators. The keys, once actuated, generate key signals that are applied to the test unit 10. The microprocessor signal and the key signals are transmitted to the test unit 10 and analyzed thereby. In accordance with a preferred embodiment, the microprocessor of the keyboard is tested first.

The keyboard testing system 100 further comprises an indicator sensing device 20 which comprises light detecting means comprising at least one optic sensor for receiving and detecting light emitted from the indicators of the keyboard. As is generally known, the keyboard indicators are usually light emitting diodes (LEDs). The indicator sensing device 20 detects light emitted from the LED indicators and generate a signal to the test unit 10 for indicating if the indicators are functioning properly.

A key testing device 30 comprises a pneumatic actuator system 31 and at least one end effector 32. The pneumatic actuator system 31 comprises at least one pneumatic cylinder controlled by the test unit 10 to move the end effector 32. Each end effector 32 is mounted to one pneumatic cylinder and moved thereby to approach/leave and thus actuate/de-actuate keys of the keyboard 200 for testing the keys. If the keys function well, then when the keys are actuated by the end effectors 32, a signal is generated and transmitted to the test unit 10. An example of the end effector 32 comprises a contact element that is moved by the pneumatic cylinder to engage with/disengage from the key of the keyboard. Another example of the end effector 32 comprises a nozzle that generates a strong air stream to actuate the keys.

A conveying device 40 is controlled by the test unit 10 to sequentially move the key testing device 30 to each of the keys whereby the keys may be tested sequentially by being actuated by the end effectors 32. As noted above, the test result of the keys is transmitted to the test unit 10 and analyzed thereby.

A fault warning device 50 comprises audio signal generation means, such as a buzzer, and video signal generation means, such as an LED indicator. The fault warning device 50 is connected to and controlled by the test unit 10 to provide both audio and video signals when a fault occurs during testing the keyboard 200 (namely the keyboard 200 fails to test) thereby informing an operator to handle the fault keyboard. The fault test result is then stored in the test unit 10 for future use.

Figure 2:
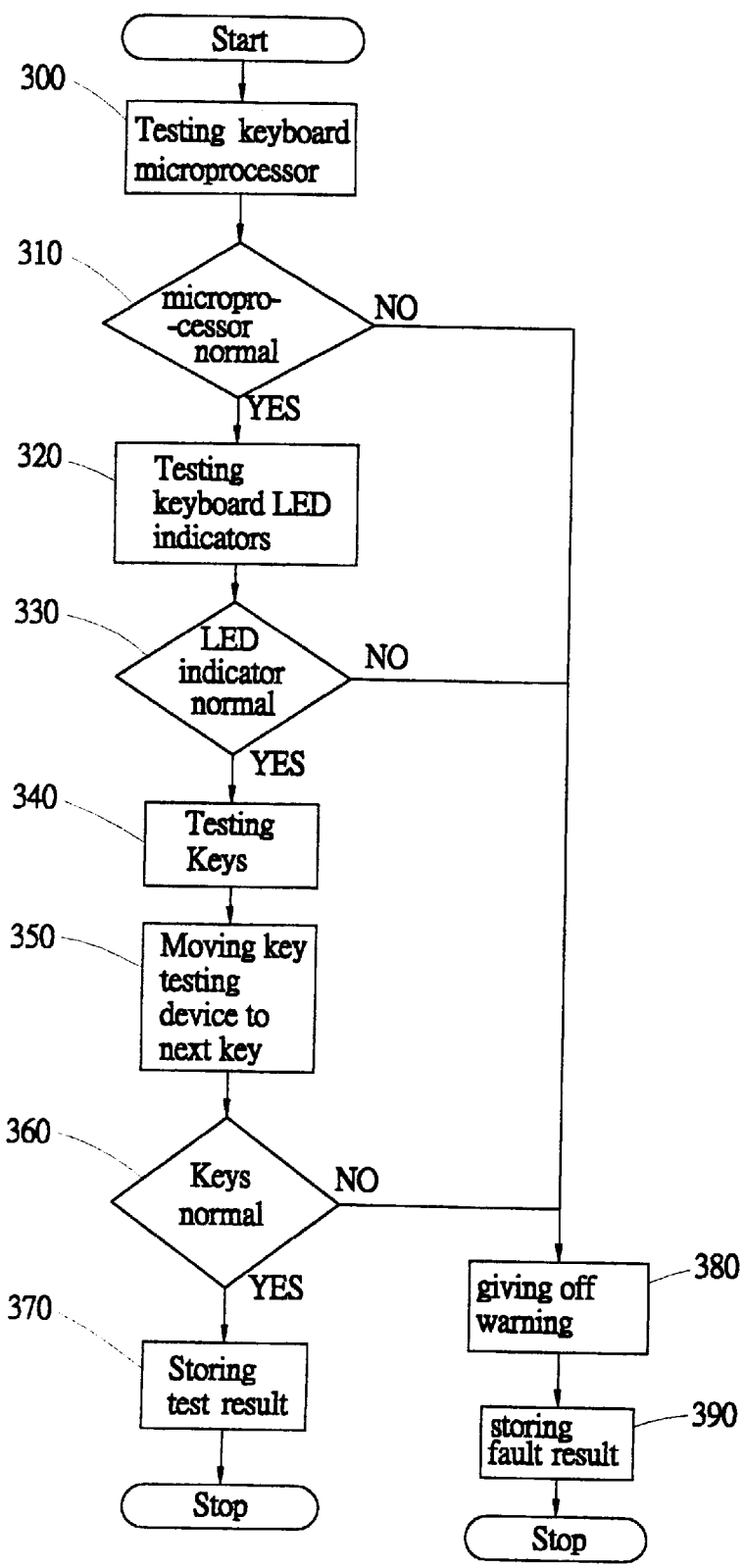
FIG. 2 shows a flow chart of a control process of the keyboard testing system of the present invention.

FIG. 2 shows a flow chart demonstrating a test process conducted by the test unit 10 of the keyboard testing system 100 in testing the keyboard 200. The test process may be coded as computer software loaded and executed in the test unit 10. At step 300, the test unit 10 tests the microprocessor of the keyboard 200 and the test result is analyzed by the test unit 10 (step 310) to check if the microprocessor is normal. The analysis is achieved by comparing the test result with pre-established data stored in the test unit 10 to check if they match each other.

If the test result is acceptable, the keyboard testing system 100 goes on testing the LED indicators of the keyboard 200 at step 320. The indicator sensing device 20 detects light emitted from the LED indicators of the keyboard 200 when the LED indicator is energized. The test unit 10 receives signals from the indicator sensing device 20 and checks if the LED indicators function normally in accordance with the detection signal from the indicator sensing device 20.

If the LED indicators of the keyboard 200 are properly functioning, then the keyboard testing system 100 goes on testing the keys of the keyboard 200 by means of the key testing device 30 at step 340 and sequentially moving the key testing device 30 to each key (step 350) in order to test all the keys. The test result is sent to the test unit 10 and analyzed thereby to determine if the keys operate normally (step 360).

In steps 310, 330 and 360, if an abnormal or fault condition is found, warning signals are given off by means of the fault warning device 50 under the control of the test unit 10 (step 380). The operator is informed of the abnormal condition of the keyboard 200. Thereafter, at step 390, the fault condition is recorded and stored and the process pauses until the keyboard 200 is removed from the testing system 100 by the operator.

Apparently, the keyboard testing system 100 of the present invention is intended to provide a measure for automatically testing the microprocessor, the LED indicators and the keys of a keyboard which notifies the operator of any fault condition of the keyboard and stores the test result. Thus, an efficient and effective way for testing keyboard is obtained.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A keyboard testing system adapted to test a keyboard having a microprocessor, indicators and keys, the keyboard testing system comprising:

a processor-based test unit electrically coupled to the keyboard to control the microprocessor of the keyboard and to receive a response signal therefrom;

an indicator sensing device coupled to said test unit, said indicator sensing device being adapted to sense the status of indicators of the keyboard, and said indicator sensing device comprising light detecting means for detecting light emitted from the indicators of the keyboard and for generating an indicator signal corresponding to the status of the indicators of the keyboard, said indicator signal being supplied to said test unit;

a key testing device comprising key actuation means controlled by said test unit for actuating/de-actuating each of the keys of the keyboard in a predetermined sequence, wherein a key signal corresponding to the status of each tested key is generated and applied to said test unit;

a conveying device controlled by said test unit and operatively coupled to said key testing device to sequentially move said key testing device into proximity to each of the keys of the keyboard in said predetermined sequence in order to actuate/de-actuate the keys of the keyboard by said key testing device; and a warning device driven by said test unit to generate a warning signal when a fault condition is determined by said test unit upon receiving of said response signal from the microprocessor, said indicator signal corresponding to the status of the indicators of the keyboard, and said key signal.

2. The keyboard testing system as claimed in claim 1, wherein said test unit comprises a computer and programmable logic control means.

3. The keyboard testing system as claimed in claim 1, wherein said light detecting means of said indicator sensing device comprises at least one optic sensor.

4. The keyboard testing system as claimed in claim 1, wherein said key actuation means comprises a pneumatic actuator system, and at least one end effector movable by said pneumatic actuator system.

5. The keyboard testing system as claimed in claim 4, wherein said pneumatic actuator system comprises at least one pneumatic cylinder, said end effector being mounted to said pneumatic cylinder.

6. The keyboard testing system as claimed in claim 4, wherein said end effector comprises a contact element.

7. The keyboard testing system as claimed in claim 4, wherein said end effector comprises a nozzle ejecting an air stream for actuating the key.

8. The keyboard testing system as claimed in claim 1, wherein said test unit comprises control process means loaded therein for controlling the operation of said test unit.

9. A method for testing a keyboard including a microprocessor, indicators and keys thereof, said method comprising the steps of:

a. testing the microprocessor of the keyboard;

b. obtaining a first test result corresponding to the function of the microprocessor of the keyboard;

c. testing the indicators of the keyboard by means of a light detecting device;

d. obtaining a second test result corresponding to the status of the indicators of the keyboard;

e. testing a respective one of the keys of the keyboard by means of a key testing device;

f. moving said key testing device to a next one of the keys of the keyboard;

g. repeating steps (e) and (f) until all keys of the keyboard have been tested in a predetermined sequence;

h. obtaining a third test result corresponding to the status of each tested key of the keyboard; and i. storing said first, second and third test results.

10. The method as claimed in claim 9, further comprising the steps of issuing a warning signal when said first test result is a fault result, and recording the fault result.

11. The method as claimed in claim 9, further comprising the steps of issuing a warning signal when said second test result is a fault result, and recording the fault result.

12. The method as claimed in claim 9, further comprising the steps of issuing a warning signal when said third test result is a fault result, and recording the fault result.

* * * * *